Patented Oct. 4, 1927.

1,644,003

UNITED STATES PATENT OFFICE.

HERMANN WAGNER, OF SODEN-ON-THE-TAUNUS, AND ALBERT FUNKE, OF HOCHST-ON-THE-MAIN, GERMANY, ASSIGNORS TO GRASSELLI DYESTUFF CORPORATION, OF NEW YORK, N. Y., A CORPORATION OF AMERICA.

GREENISH-YELLOW AZO DYESTUFF AND PROCESS OF MAKING SAME.

No Drawing.  Application filed October 8, 1925.  Serial No. 61,300.

We have found that a valuable insoluble greenish-yellow azo dyestuff is obtained, being of an excellent fastness to light and oil, by coupling diazotized 4-chloro-2-nitraniline with aceto-acetic-para-chloranilide. The dyestuff has the following formula:

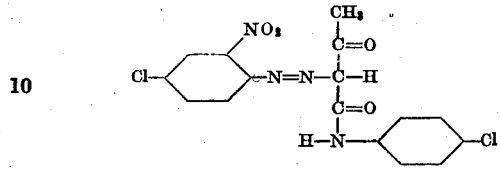

The dyestuff may for instance be prepared as follows:—

34, 4 parts by weight of 4-chloro-2-nitraniline are diazotised in the usual manner. The diazo solution is run into an aqueous suspension of 43.6 parts of aceto-acetic-para-chloranilide to which the required quantity of sodium acetate has been added in order to facilitate the reaction. The coupling proceeds quickly and is immediately complete. The resulting azo dyestuff is then filtered by suction and dried. It forms a yellow powder with a green hue, which dissolves in sulfuric acid to a brownish-yellow solution. The coupling may be effected in presence or absence of a substratum. In the latter case, the dyestuff is converted into its lake by suspending and mixing it with a substratum.

We claim:—

1. The process for producing a greenish yellow azo dye-stuff which consists in coupling diazotised 4-chloro-2-nitraniline with aceto-acetic-para-chloranilide.

2. As a new product, the azo dyestuff of the following formula:

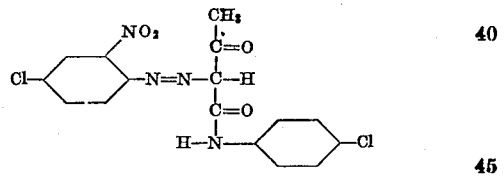

being a greenish-yellow powder.

In testimony whereof, we affix our signatures.

Dr. HERMANN WAGNER.
Dr. ALBERT FUNKE.